(12) United States Patent
Haaf

(10) Patent No.: US 8,578,890 B1
(45) Date of Patent: Nov. 12, 2013

(54) CAT SCRATCHING DEVICE

(71) Applicant: Worldwise, Inc., San Rafael, CA (US)

(72) Inventor: David Haaf, San Rafael, CA (US)

(73) Assignee: Worldwise, Inc., San Rafael, CA (US)

( * ) Notice: Subject to any disclaimer, the term of this patent is extended or adjusted under 35 U.S.C. 154(b) by 0 days.

(21) Appl. No.: 13/738,693

(22) Filed: Jan. 10, 2013

(51) Int. Cl.
*A01K 15/02* (2006.01)
*A01K 29/00* (2006.01)

(52) U.S. Cl.
USPC .............................................. 119/706; 119/707

(58) Field of Classification Search
USPC ............................ 119/706, 705, 702, 707, 708
See application file for complete search history.

(56) References Cited

U.S. PATENT DOCUMENTS

| | | | | | |
|---|---|---|---|---|---|
| 1,022,113 | A | * | 4/1912 | Smith | 119/711 |
| 3,085,551 | A | * | 4/1963 | Helmer | 119/706 |
| 3,993,027 | A | * | 11/1976 | Mullin | 119/706 |
| 5,269,261 | A | * | 12/1993 | McCance | 119/706 |
| 5,275,127 | A | * | 1/1994 | Leopold | 119/706 |
| 5,592,901 | A | * | 1/1997 | Birmingham | 119/706 |
| 5,775,263 | A | * | 7/1998 | Richards | 119/706 |
| 5,988,114 | A | * | 11/1999 | Krietzman et al. | 119/706 |
| 6,021,741 | A | * | 2/2000 | Krietzman et al. | 119/706 |
| 6,715,447 | B2 | * | 4/2004 | Haber | 119/702 |
| 7,011,043 | B2 | * | 3/2006 | Diep | 119/601 |
| 7,117,821 | B2 | * | 10/2006 | Novak | 119/706 |
| D544,155 | S | * | 6/2007 | Lamstein et al. | D30/160 |
| D555,299 | S | * | 11/2007 | Tsengas | D30/160 |
| D563,059 | S | * | 2/2008 | Lamstein et al. | D30/160 |
| 7,357,421 | B2 | * | 4/2008 | Locker et al. | 281/15.1 |
| 7,373,902 | B2 | * | 5/2008 | Levan | 119/702 |
| 7,647,893 | B2 | * | 1/2010 | Kraus | 119/706 |
| 7,958,851 | B2 | * | 6/2011 | Lamstein et al. | 119/706 |
| D644,797 | S | * | 9/2011 | Haaf | D30/160 |
| D665,138 | S | * | 8/2012 | Haaf et al. | D30/160 |
| 8,418,655 | B2 | * | 4/2013 | Yu | 119/706 |
| 2006/0137623 | A1 | * | 6/2006 | Lamstein | 119/706 |

* cited by examiner

*Primary Examiner* — Yvoone Abbott
(74) *Attorney, Agent, or Firm* — Bay Area Technology Law Group PC

(57) ABSTRACT

A cat scratching device having a body portion composed of molded pulp and catnip. When molded, its exterior surface is convex and ideally includes a rope handle enabling the device to hang from a doorknob or similar support.

9 Claims, 1 Drawing Sheet

CAT SCRATCHING DEVICE

TECHNICAL FIELD

The present invention involves a cat scratching device for providing a cat scratching surface for use by domestic cats. This device is made by grinding cellulosic feedstock generally in the form of recycled paper and wood pulp with water and catnip forming a slurry which is molded in a form to create the shape of said device.

BACKGROUND OF THE INVENTION

It is well recognized that domestic cats crave scratching as part of their natural instinctive character. If a dedicated scratching surface is not provided, domestic cats will generally satisfy their need to scratch by turning to furniture, curtains and other articles which can be substantially damaged as a consequence. Oftentimes, pet cats will not only climb over furniture, especially upholstered chairs and sofas, but will use such furniture and carpeting to condition their claws through deliberate and repeated clawing, pulling and tearing actions specifically with their forepaws. As noted, this clawing activity appears to be an irresistible natural impulse for cats and can be the source of great aggravation to the pet owner.

A number of vendors of pet related products have offered dedicated scratching posts and surfaces in order to ameliorate this problem. Current devices consist of several alternative designs. A first group of cat scratchers consist of a rigid support covered with a plush surface such as a rug or sisal. Such objects are generally in the shape of a post or beam which the cat can climb on or otherwise engage during the clawing process. Because carpet is not a natural clawing surface and was never intended, at manufacture, to perform this function, it is not an ideal scratching medium. In addition, manufacturers of such products find it oftentimes advantageous to include catnip within the scratching surface. When it comes to carpet or similar surfaces, the catnip, not being manufactured into the carpet originally, is dusted on the surface as an add-on feature and thus is easily dislodged during use.

Alternatively, scratchers oftentimes employ cardboard as their scratching surfaces. Many cats find cardboard preferable to carpeting as it is a soft material having corrugations that cats seem to enjoy. However, cardboard is relatively soft and is easily destroyed with even modest scratching activity.

It is thus an object of the present invention to provide a cat scratching device which overcomes the shortcomings and limitations of the prior art as noted above.

These and further objects will become more readily apparent when considering the following disclosure and appended claims.

SUMMARY OF THE INVENTION

A cat scratching device having a body portion composed of molded pulp and catnip. When molded, its exterior surface is convex and ideally includes a rope handle enabling the device to hang from a doorknob or similar support.

DETAILED DESCRIPTION OF THE INVENTION

Figure 1:
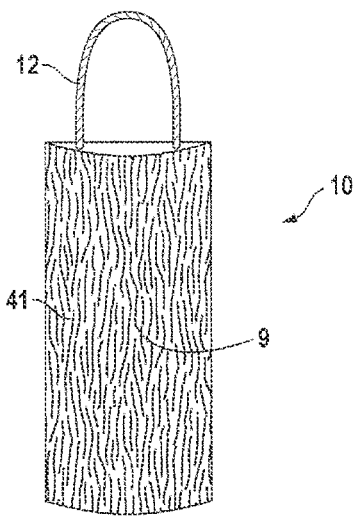
FIG. 1 is a perspective view of the cat scratching device of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

In turning to FIG. 1 the present invention involves a cat scratching device 10 comprised of a body portion 41. Body portion 41 is composed of molded pulp having exterior surface 9 molded, as a preferred embodiment, to replicate tree bark noting that, during the molding process, catnip can be uniformly dispersed within body portion 41 to enhance the cat scratching experience.

Figure 2:
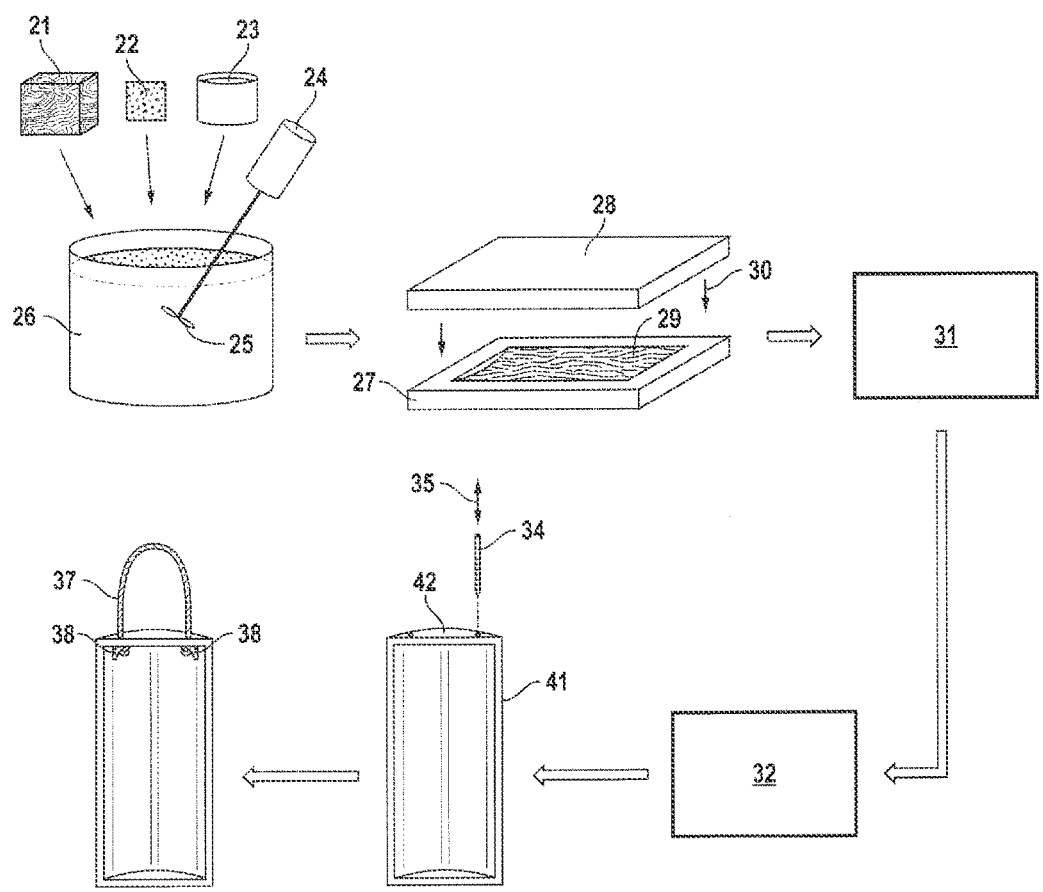
FIG. 2 is a schematic of a method used to produce the cat scratching device of FIG. 1.

Cat scratching device 10 is produced by a process shown schematically in FIG. 2. Specifically, a quantity of recycled paper or wood pulp 21, catnip 22 and water 23 are placed within container 26. Ideally, catnip 22 would represent up to about five percent (wt) of the finished cat scratching device. The various ingredients received within container 26 are ground into a pulp slurry through the use of motor 24 driving shear blade 25. The slurry is then introduced into mold half 27 having convex indent 29 configured within its surface. Complementary mold half 28 is then placed upon mold half 27 in the direction of arrow 30. During this molding process, each cat scratching body 41 is formed having a convex exterior surface and if one wishes, is molded to replicate tree bark. This is achieved by removing body 41 from mold halves 27 and 28 which is then introduced into oven 31 for drying at 50 to 60 degrees C. for 24 hours. Flashing is trimmed at trim station 32. Cat scratching body 41 is then configured with holes through the use of drill bit 34 moved in the direction of arrows 35 on its top surface 42. Rope handle 37 can then be inserted with both holes configured by drill bit 34 and knots 38 formed within the interior of device half 41 to prevent rope handle 37 from being inadvertently removed therefrom.

The cat scratching device of the present invention has certain advantages over the prior art which lends itself to the creation of an ideal cat scratcher. Cellulosic molded pulp characteristically has the right feel and texture to encourage cat scratching. As it is a uniform (homogeneous) material, a cat's claws cannot be hung up as they might be when using carpet or sisal as the cat scratching surface. Catnip can be uniformly dispersed within the body of the device thus preventing inadvertent spillage characteristic of the prior art. Although the device of this invention can be made with virtually any surface features, it is contemplated that it be provided with a surface having random striations replicating tree bark, simulating a natural surface, that is, one which a cat would find in nature and thus would provide the cat with appropriate natural stimulation.

Finally, the present device, in using a rope handle, can be hung from a doorknob or similar support or simply placed on a pet owner's floor thus facilitating its use in a home environment noting that when use is to be interrupted, it is a simple matter to remove the device from its support or remove it from one's floor to be placed in a closet, drawer or some other location inaccessible to the feline pet. Lastly, as noted above, as recycled paper and wood pulp can be used to make the present invention, it is quite environmentally friendly.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A cat scratching device comprising a body portion, said body portion comprised of molded pulp forming an uncorrugated self-supporting convex exterior surface and having catnip dispersed therein.

2. The cat scratching device of claim 1 wherein said molded pulp comprises a member selected from the group consisting of recycled paper and wood pulp.

3. The cat scratching device of claim 1 wherein said exterior surface is molded to replicate tree bark.

4. The cat scratching device of claim 1 further comprising a rope handle.

5. The cat scratching device of claim 1 wherein said body portion comprises up to approximately five percent (wt) of catnip.

6. A cat scratching device comprising a body portion, said body portion made by grinding a member selected from the group consisting of recycled paper and wood pulp with water and catnip to form a slurry and molding said slurry in a form to create a self-supporting uncorrugated shape of said cat scratching device.

7. The cat scratching device of claim 6 wherein an exterior surface of which is molded to replicate tree bark.

8. The cat scratching device of claim 6 further comprising a rope handle.

9. The cat scratching device of claim 6 wherein said body portion comprises up to approximately five percent (wt) of catnip.

\* \* \* \* \*